(12) United States Patent
Yao et al.

(10) Patent No.: US 9,384,352 B2
(45) Date of Patent: Jul. 5, 2016

(54) TRUSTED BOOT AND RUNTIME OPERATION

(71) Applicant: Intel Corporation, Santa Clara, CA (US)

(72) Inventors: Jiewen Yao, Shanghai (CN); Vincent J. Zimmer, Federal Way, WA (US); Nicholas J. Adams, Beaverton, OR (US); Willard M. Wiseman, Tigard, OR (US); Qin Long, Shanghai (CN); Shihui Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 14/127,211

(22) PCT Filed: Oct. 2, 2013

(86) PCT No.: PCT/CN2013/084806
§ 371 (c)(1),
(2) Date: Dec. 18, 2013

(87) PCT Pub. No.: WO2015/048922
PCT Pub. Date: Apr. 9, 2015

(65) Prior Publication Data
US 2015/0095633 A1    Apr. 2, 2015

(51) Int. Cl.
G06F 9/00 (2006.01)
G06F 21/57 (2013.01)
G06F 21/72 (2013.01)
G06F 9/44 (2006.01)

(52) U.S. Cl.
CPC .............. *G06F 21/575* (2013.01); *G06F 21/72* (2013.01); *G06F 9/4403* (2013.01)

(58) Field of Classification Search
CPC ... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | |
|---|---|---|---|
| 8,312,258 | B2 | 11/2012 | Xing et al. |
| 8,522,066 | B2 | 8/2013 | Zimmer |

(Continued)

FOREIGN PATENT DOCUMENTS

| | | |
|---|---|---|
| CN | 102298529 | 12/2011 |
| JP | 2009-169485 | 7/2009 |
| WO | WO2012/012218 | 1/2012 |

OTHER PUBLICATIONS

"UEFI Security Enhancements," UEFI Fall Plugfest, Oct. 24-27, 2011, www.uefi.org.

(Continued)

*Primary Examiner* — Zahid Choudhury
(74) *Attorney, Agent, or Firm* — Trop, Pruner & Hu, P.C.

(57) ABSTRACT

An embodiment includes an apparatus comprising: an out-of-band cryptoprocessor including secure non-volatile storage that couples to a root index, having a fixed address, and comprises first and second variables referenced by the root index; and semiconductor integrated code (SIC) including embedded processor logic to initialize a processor and embedded memory logic to initialize a memory coupled to the processor; wherein (a) the SIC is to be executed responsive to resetting the processor and prior to providing control to boot code, and (b) the SIC is to perform pre-boot operations in response to accessing at least one of the first and second variables. Other embodiments are described herein.

21 Claims, 7 Drawing Sheets

(56) References Cited

U.S. PATENT DOCUMENTS

2007/0098149 A1* 5/2007 Coenen ............... G06F 21/123
                                                       380/2
2011/0320798 A1* 12/2011 Zimmer ............... G06F 21/14
                                                       713/2
2012/0023318 A1* 1/2012 Xing ................... G06F 9/4403
                                                       713/2

OTHER PUBLICATIONS

"General UEFI Variables," http://apps.insyde.com/app/Help/SecureBootCheckup/UEFI%20Secure%20Boot%20Checkup.html?GeneralUEFIVariables.html, 2013.

"The Meaning of all the UEFI Keys," James Bottomley's random Pages, posted in UEFI Secure Boot, Jul. 11, 2012, http://blog.hansenpartnership.com/the-meaning-of-all-the-uefi-keys/.

"Unified Extensible Firmware Interface," ArchWiki, Nov. 29, 2013, https://wiki.archlinux.org/index.php/Unified_Extensible_Firmware_Interface.

"Trusted Platforms; UEFI, PI and TCG-based firmware," White Paper by Intel Corporation and IBM Corporation, Vincent J. Zimmer, Shiva R. Dasari, Sean P. Brogan, Sep. 2009.

International Searching Authority, Notification of Transmittal of the International Search Report and the Written Opinion of the International Searching Authority, mailed 30 Jun. 2014, in International application No. PCT/CN2013/084806.

* cited by examiner

TRUSTED BOOT AND RUNTIME OPERATION

TECHNICAL FIELD

An embodiment addresses trusted computing.

BACKGROUND

Historically, basic input/output system (BIOS) software, which is low level software used to boot up (i.e., perform boot operations such as loading and starting an operating system, testing hardware, and the like) and perform low level operations in a computer system, has typically been incorporated by so-called original equipment manufacturers (OEMs), namely the computer manufacturers. To provide BIOS support for processors, a processor manufacturer (so-called silicon manufacturer) provides detailed information to the OEMs. This information is typically in the form of source code. However, by providing this code hardware intellectual property (IP) aspects of the processor, such as how to program it and underlying hardware details, are exposed to third parties. Further, by providing source code, the OEMs can modify the code, integrate it in a non-standard manner, or tweak it to support non-standard hardware which can raise complexity and operating concerns, leading to added support costs for the silicon manufacturer.

Examples of information typically provided to initialize a system include details regarding a processor, interconnect links, memory fabric, and so forth. Such details may include register definitions and interfaces to this hardware. This information is distributed, in addition to OEMs, to independent BIOS vendors (IBVs). As processors and other advanced silicon controllers are incorporated into different types of systems and devices (e.g., mobile computing nodes such as tablets and Smartphones), the varying formats of BIOS will expand greatly, raising more IP concerns and support challenges.

Furthermore, malicious attacks on BIOS will only become more prevalent in the future. Thus, providing a BIOS that is easy to support over varying platform configurations used by OEMs and IBVs (see above), while also being secure against malware and the like, raises IP concerns and support challenges further still.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

Figure 1:
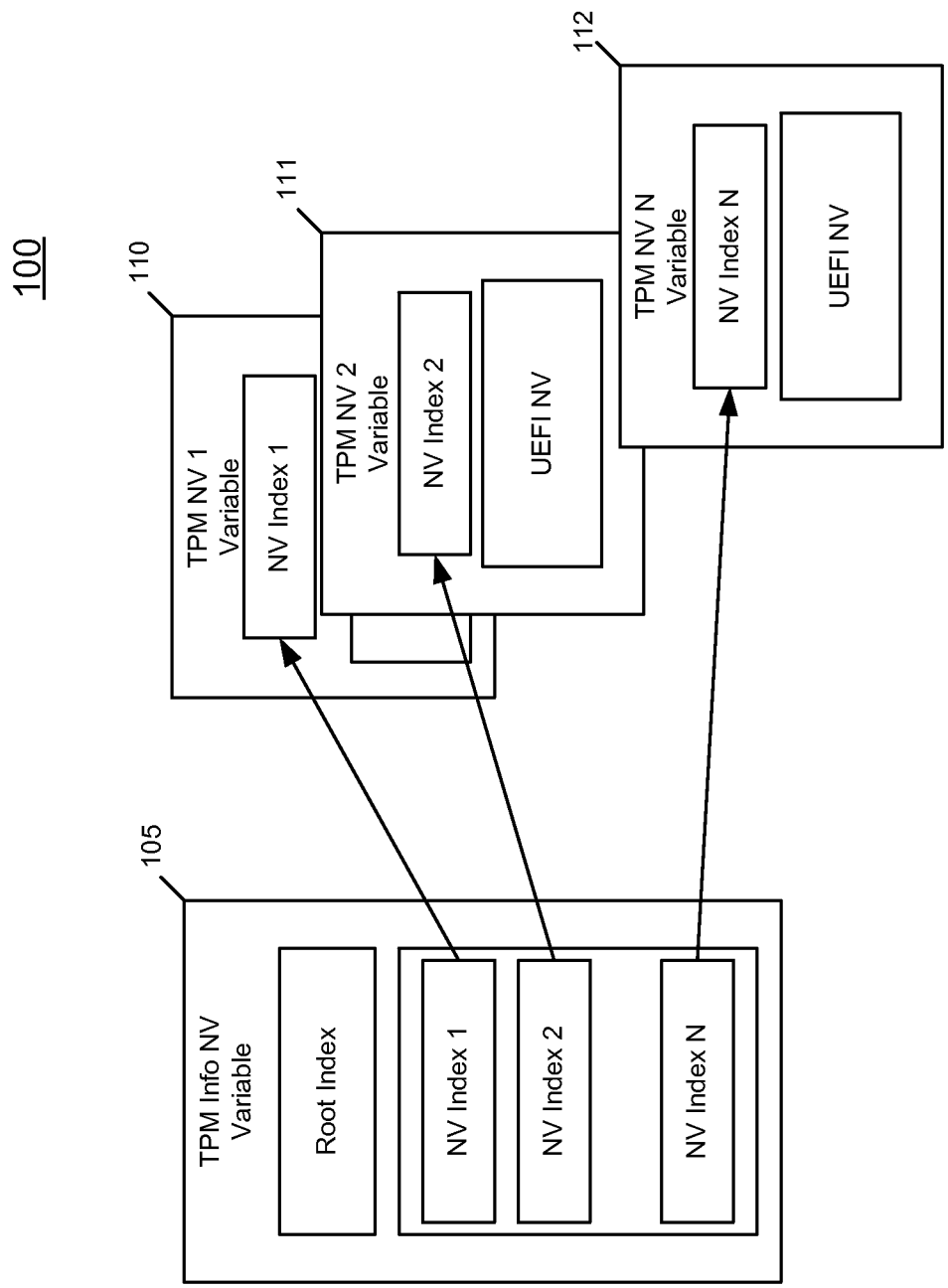
FIG. 1 includes a system for mapping non-volatile storage of a trusted product module (TPM) to Unified Extensible Firmware Interface (UEFI) variables, included in the storage, in an embodiment of the invention.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

An embodiment includes a secure out-of-band cryptoprocessor, such as a trusted product module (TPM), including secure non-volatile (NV) storage (e.g., random access memory (RAM)) that comprises a root index, having a fixed address, and first and second variables, such as Unified Extensible Firmware Interface (UEFI) variables, referenced by the root index. The embodiment further includes semiconductor integrated code (SIC) including embedded processor logic to initialize a processor and embedded memory logic to initialize a memory coupled to the processor; wherein the SIC is to be executed responsive to resetting the processor and prior to providing control to boot code.

An embodiment maps UEFI variables into TPM NV memory, such as flash memory, so the SIC has a generic way to access the UEFI variables regardless of where one or more OEMs decide to locate or arrange the memory. In other words, if two OEMs arrange flash storage differently the same SIC can follow the "map" or index to still locate the UEFI variables in both storage scenarios despite those variables being located in different places in the different flash arrangements used by the different OEMs. The SIC may include pre-boot instructions specific to, for example, a processor manufacturer. Furthermore, because the variables are stored in the TPM, certain TPM utilities (e.g., read_only and write_only attributes for the variables) may be used to bind the variables to the platform in a secure way (to prevent attack from malware or user error). This confidentiality provided by the TPM allows for secure storage of variables that may include sensitive materials, such as root or master keys for the platform, person identification numbers (PINs), and UEFI variables.

Thus, embodiments provide several advantages. First, an embodiment provides a way for a silicon manufacture to protect its initialization code. Second, that code may interact with BIOS components, such as UEFI variables, that are securely stored in a TPM. Third, despite the variables being stored in a TPM, those variables may still be accessible to the SIC as well as to the OEM BIOS, during both bootime and runtime. Other embodiments are described herein.

While UEFI variables and TPMs are addressed herein for many of the embodiments, this is done for ease of explanation and brevity and does not imply all embodiments are limited to either of UEFI variables or TPMs. Other embodiments may be used with other pre-boot code, boot code, initialization code, and/or BIOS code as well as with other secure crypto-processors and/or secure storage mechanisms. Furthermore, specific standards are mentioned for brevity but embodiments are not limited to any one BIOS or TPM standard or any other standard. A more detailed discussion of various embodiments now follows.

As mentioned above, an embodiment has an advantage by providing a way for a silicon manufacture to protect its initialization code. This is now discussed in greater detail.

To provide BIOS support for processors, a processor manufacturer conventionally provides detailed information to the OEMs. This may lead to a loss of confidentiality for the detailed information. However, an embodiment uses SIC to address these issue. As described more fully in U.S. Patent Application Publication 2011/0320798 (U.S. Pat. No. 8,522, 066), assigned to Intel Corp. of Santa Clara, Calif., SIC may include early initialization software that has a tightly coupled binding to underlying processor hardware such that the silicon manufacturer controls and provides early initialization software, rather than it being implemented by OEM BIOS.

The SIC may be used in an environment to load the code, guarantee its provenance and after execution of the SIC, and hand control off to OEM BIOS/boot code in a seamless fashion. The SIC may be used to perform low level aspects of memory initialization such as training, in which analog links are set up, diagnostics and design for test hooks. While all embodiments are not limited in this regard, key initialization code for memory controller and interconnect links, as well as runtime support for various processor and system features may be in the form of SIC. In some embodiments, a root of trust to this code can be provided via a hook in processor microcode to implement a SIC loader to authenticate and then load the SIC, which may be a form of silicon manufacturer's BIOS, and then pass control to the OEM BIOS. Given the challenges of upgrade to an OEM BIOS, a memory storing the BIOS such as a firmware volume incorporated in a flash memory could be hostile, so a root of trust for core microcode within the processor package to launch the SIC loader may be used to guarantee that those subsidiary blocks of the OEM BIOS that include the SIC are valid.

After execution of the SIC, control may pass to an OEM BIOS which may be implemented according to a UEFI open source standard (e.g., UEFI Specification Version 2.3.1c, available at wwwuefiorg/specs/) or via a conventional BIOS or proprietary OEM boot code, each of which boots one or more operating systems (OSs). In some implementations, the SIC may be used to perform patches (e.g., to resolve errors or to perform binary translation). Also, the SIC may set protections for certain memory blocks, (e.g., to hide a memory block for binary translation, error handling, or other code of a silicon manufacturer that is to run during runtime and be invisible to the OS). In this way, where a processor uses reserved code, such as for microcode read only memory (uROM) offload, co-processor support and the like, having the SIC provide this memory prior to exposing the machine to third party OEM code allows for a subset of the memory to be available to the processor.

In various embodiments, the SIC may be provided as binary code for incorporation into an OEM BIOS (e.g., as a flash or other NV memory), or the SIC can be implemented in NV storage of a processor package. Thus, embodiments enable a processor or other silicon manufacturer to ship binary modules to customers, rather than source code, providing greater IP protection. Further with a growing number of customers, technical support costs can be reduced by shipping BIOS building blocks together with silicon.

The SIC may provide for a platform independent BIOS. By platform independent, it is meant that the components included are to be executed on any given platform, regardless of the specifics of the machine (e.g., memory types, link speeds, voltages available, etc.). Instead, anything that may be platform dependent can be codified through a platform manufacturer data file. As an example, the platform vendor may parameterize certain information such as information regarding the system board and so forth. Certain components doing fundamental initializations (e.g., a link initialization establishing root of trust) can be done by the SIC before handing control to third party code. This temporal isolation of the SIC provides a guarantee that the processor owns the hardware at power on reset and only SIC code can run until control is given to third party code.

The SIC components may include an initial program loader (IPL), which is responsible for locating and loading the rest of the SIC before third party code. Note that this loader may not be considered a component of the SIC. The components of the SIC may be transitory or persistent. For a persistent embodiment, it could be active (acting like a platform initialization (PI) module) or passive (acting like a library, through new instructions).

In an embodiment the SIC includes an embedded central processing unit (CPU) logic (ECL), which initializes inter-processor logics such as on-board interconnects. Training for both link and memory initialization may include communication between both ends of the link. In the case of a link, a processor may be coupled to another processor or an input/output (IO) hub, and can determine the optimal frequency and link widths at which they can transact data. This ECL module may typically be transitory. In some embodiments, link initialization may be redone without damaging memory contents in a resume operation from a low power state (e.g., an Advanced Configuration and Power Interface (ACPI) low power state, e.g., S3 of the ACPI Specification Version 4.0 (Jun. 16, 2009)).

The SIC may further include an embedded memory logic (EML) to initialize memory. This component may be partially transitory and partially persistent during runtime (e.g., for handling temperature throttling or error handling). Memory initialization may further include setting up addressing, as different components have different views of memory. For example, the CPU may have a processor physical address, the dynamic random access memory (DRAM) may have a DRAM physical address, and in some embodiments there may be a platform physical address. Thus there can be different views of memory depending on how link address decoders are programmed. To enable an amount of sequestered memory for the processor, a subset of the address decoders and memory decoders may be programmed for the processor. This sequestered memory may be exclusively used by the processor during system operation, and may store microcode offload, a binary translator, licensing information, manageability information and so forth. In addition reserved logic may be used to support other features of a platform independent logic.

Thus, an embodiment uses SIC to protect control and confidentiality regarding initialization code for a processor or other component. The SIC may need to interact with certain components that are not included in the SIC. Also, such components may need to be accessible to code not implemented in the SIC. Such components may be accessible to the SIC and other components (e.g., OEM BIOS) while still being resistant to malicious activity. Such components may include, for example, UEFI variables that are used in UEFI Secure Boot techniques. UEFI variables are used to save MRC (Memory Reference Code) configuration data, PCH (Platform Control Hub) configuration data, SA (System Agent) configuration data, keys, and the like. UEFI Secure Boot techniques are standardized (e.g., UEFI2.3.1c specification) and some UEFI techniques are implemented in open source arrangements (e.g., edk2sourceforgenet).

As mentioned above, an embodiment has an advantage of interacting with BIOS components, such as UEFI variables, that are securely stored in a TPM. This is now discussed in greater detail.

Regarding making these variables resistant to malicious activity, these UEFI variables are susceptible to malicious activities. Specifically, OEM/IBVs store variable data on a flash region and use system management mode (SMM) to maintain the integrity of the variable data (i.e., there is no confidentiality control). Thus, the variables are susceptible to malicious activity, such as a "shack attack", which is a low-budget hardware attack where attackers have physical access to the device, but not enough equipment or expertise to attack within the integrated circuit packages. The attackers attempt to connect to the device using JTAG debug, boundary scan I/O, and built-in self test facilities. They can passively monitor the system using logic probes and network analyzers to snoop bus lines, pins and system signals. The attackers may also be able to perform simple active hardware attacks, such as forcing pins and bus lines to be at a high or low voltage, reprogramming memory devices, and replacing hardware components with malicious alternatives. Other threats include "ROM swipe"/"replacement" style attacks and the like.

To better secure these variables, an embodiment cryptographically binds UEFI variables to the platform by storing them in NV memory of a TPM. This is possible because, for example, TPM standard version 2.0 supports platform hierarchy and consequently, platform firmware (such as the SIC) and the OS can both use the TPM, which was not the case with previous TPM standards (e.g., TPM standard 1.2 whereby only the OS could use the TPM). Consequently, a UEFI variable (which the SIC needs access to) can be stored in a TPM. The TPM has strong access controls (e.g., read-lock to prevent reading the variable and write-lock to prevent writing to the variable). Thus, the TPM can, for example, implement READ_LOCK protection (for confidentiality) and WRITE_LOCK protection (for integrity) for the variables.

The above embodiments show, for example, how initialization code can be provided in SIC to preserve confidentiality for the initialization code. For example, the SIC may include processor vendor specific preboot code such as PEI (Pre-EFI initialization) and DXE (Driver eXecution Environment) operations. Thus, the SIC may control confidentiality of certain boot operations that serve as, for example, a BIOS Initial Boot Block (IBB). Furthermore, various initialization components that may need to be accessed by the SIC, such as UEFI variables, can be secured by including them in a secure cryptoprocessor, such as a TPM. An embodiment, described below, ensures the SIC and OEM BIOS, as well as other components, can located these components, such as UEFI variables, in a platform independent manner.

As mentioned above, an embodiment has an advantage considering, despite the variables being stored in a TPM, those variables may still be accessible to the SIC as well as to the OEM BIOS, during both bootime and runtime. This is now discussed in greater details.

Regarding location of UEFI variables, UEFI/PI specifications define NV storage variables, which can be used to save data to be available upon a S3 resume or subsequent boot. Further, the specifications define an application programming interface (API) for variable access (e.g., SetVariable, GetVariable). However, the specifications do not define how and where such variables are stored. In other words, how an OEM or IBV stores the variable(s) is implementation specific and where (i.e., variable layout on a flash region) is also implementation specific. Consequently, the SIC may have difficulty in reliably knowing where the UEFI variables are stored across a spectrum of different platforms and BIOS arrangements.

An embodiment provides a way for the SIC (e.g., processor vendor IBB) to generically access NV storage (such as storage included in a TPM) to access variable data (e.g., UEFI configuration data stored in a UEFI variable). More specifically, an embodiment provides a way to map UEFI defined standard variables to TPM NV storage so that the SIC can access the variable data in a platform independent way. OEM and IBV BIOS can follow the map to the variable data.

Figure 2:
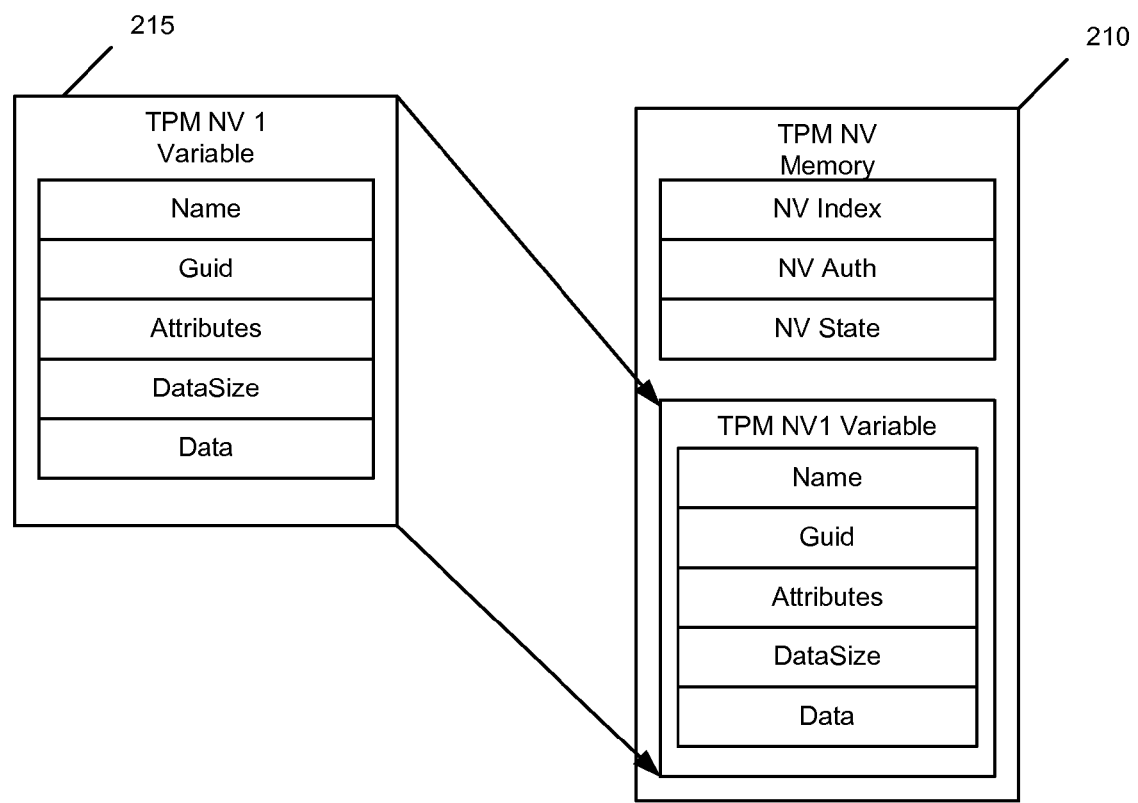
FIG. 2 includes a UEFI variable in an embodiment of the invention.

FIG. 1 includes a system for mapping NV storage of a TPM to UEFI variables in an embodiment of the invention. FIG. 2 includes a UEFI variable in an embodiment of the invention. FIGS. 1 and 2 are discussed below.

In an embodiment, to store a UEFI defined variable into TPM NV storage the TPM NV storage format is defined. As shown in FIG. 2, variable 215 (e.g., TPM NV 1 variable) may include, for example, name, Globally Unique Identifier (GUID), attributes, datasize, and data components. These components may all be stored in one content block and stored in TPM NV data region 210. Data region 210 may have other attributes like a NV index (NV Index) pointing to or referencing components of variable 215 such as "NV Auth" and "NV State". "NV Auth" may be used to check access rights for variable 215 and "NV State" may be used to check read_lock or write_lock state for variable 215. The internal attributes can be defined using, for example, a TPM_NVDefineSpace command.

In order to address numerous UEFI variables, an index is used to allow the TPM NV memory to report or map the variables it stores. The index may be implemented as a special TPM Info NV variable or TPM Root NV variable 105. (As used herein, a "NV" variable is a variable stored in NV memory.) The TPM Info NV variable 105 may have a fixed NV address (e.g., 0x01800004). The content of TPM Root NV variable 105 may include a list (NV Index) referencing the locations of first, second, and third stored variables TPM NV 1 variable 110 (also referred to above as TPM NV 1 variable 215), TPM NV 2 variable 111, TPM NV N variable 112.

In an embodiment, the TPM NV variable may include a hash (or other space saving abbreviation or derivative) of a TPM NV variable. The hash/derivative may be what is stored in the TPM NV, where storage space may be limited. This arrangement allows for a much larger set of variables to be mapped to a possibly smaller set of TPM NV memory.

Figure 3:
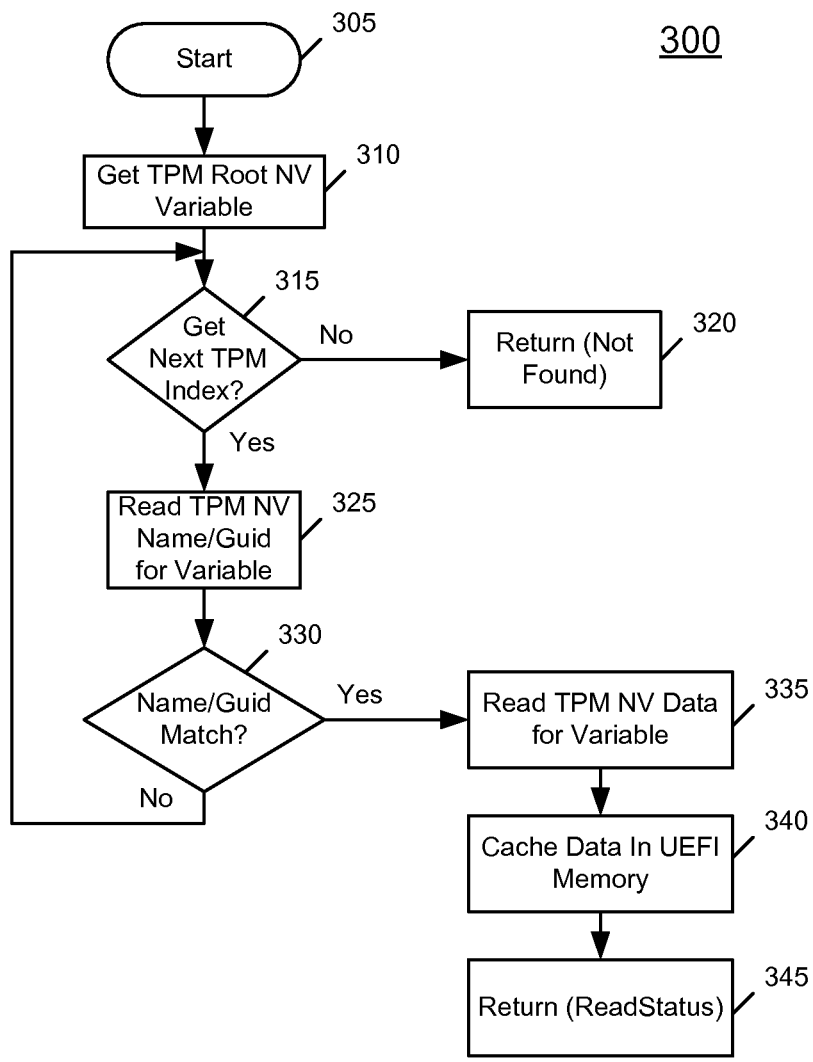
FIG. 3 includes a process for reading a UEFI variable stored in a TPM in an embodiment of the invention.

FIG. 3 includes a process for reading a UEFI variable stored in a TPM in an embodiment of the invention. In an embodiment, the GetVariable command (or something similar) is used to read a UEFI variable. After the process starts (block 305) the TPM Variable driver will automatically be set to access the Root variable (also known as the "TPM info NV" or "TPM Root NV" or element 105 in FIG. 1) (block 310), and go through the Root variable's NV Index (block 315) to determine a location for a variable and then read the corresponding variable value. If Name/Guid pair matches required the UEFI variable (blocks 325 and 330), the variable content will be returned (block 335). Otherwise the process returns to block 315 (which advances to block 320 if no index is present). In order to get better performance, the returned value can be cached into memory (block 340) and then returned (block 345). In an embodiment, policy controls can be adopted so that, for example, with a ReadLock variable attribute present (see "NV state" of element 210 in FIG. 2) the read action will return EFI_ACCESS_DENIED (e.g., directly after block 325).

Figure 4:
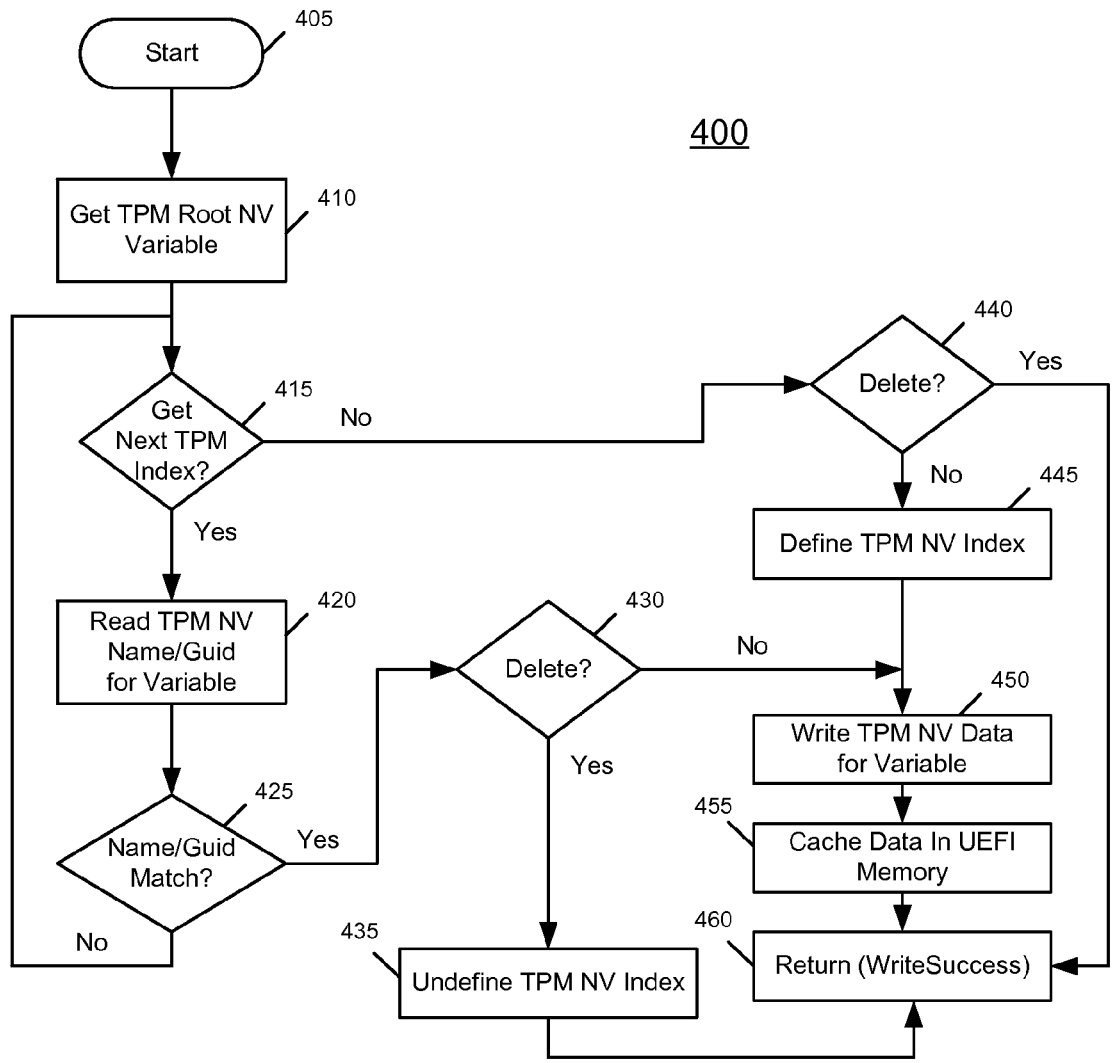
FIG. 4 includes a process for writing to a UEFI variable stored in a TPM in an embodiment of the invention.

FIG. 4 includes a process for writing to a UEFI variable stored in a TPM in an embodiment of the invention. In an embodiment, the SetVariable command (or something similar) is used to write/delete a variable. After starting (block 405), the TPM variable driver will obtain the Root NV (block 410) and access the NV Index (block 415) to see if the sought after variable is present (block 420). If not (block 425), the process returns to block 415 but if the variable is present the process advances to block 430. If the process is to delete the variable then in block 435 the variable is undefined in the index. If the process it not to delete the variable then in block 450 the new value is written to the variable. For performance considerations, the new set value will be cached into memory (block 455) and then returned (block 460). Policy controls may be adopted so that a WriteLock attribute for a variable (see "NV state" of element 210 in FIG. 2) will result in the write action producing EFI_ACCESS_DENIED (e.g., after block 450). Furthermore, if no index exists or if the present index is to be deleted (block 440) then the index is deleted. Otherwise, if no index exists but one is sought then an index is defined (block 445).

The total size of the TPM NV memory may be limited. Thus, in one embodiment the more critical variables may be stored in the TPM NV memory while just a "hash" value of the less critical variables is stored in the TPM NV memory (with the entire unhashed value stored in flash memory outside the TPM). Such a solution maintains the confidentiality and integrity of critical UEFI variables, as well as the integrity of less critical UEFI variables.

In an embodiment UEFI variables are accessible during SMM runtime as well as during boottime. During runtime the variables may be accessible to the OS, SMM, and/or the SIC. The TPM (e.g., using the 2.0 standard) has a Platform Hierarchy for BIOS usage that provides CommandArea (Start/Cancel)/StatusArea (Error)/CommandBufferArea/ResponseBufferArea operations that can be used to control TPM commands.

Figure 5:
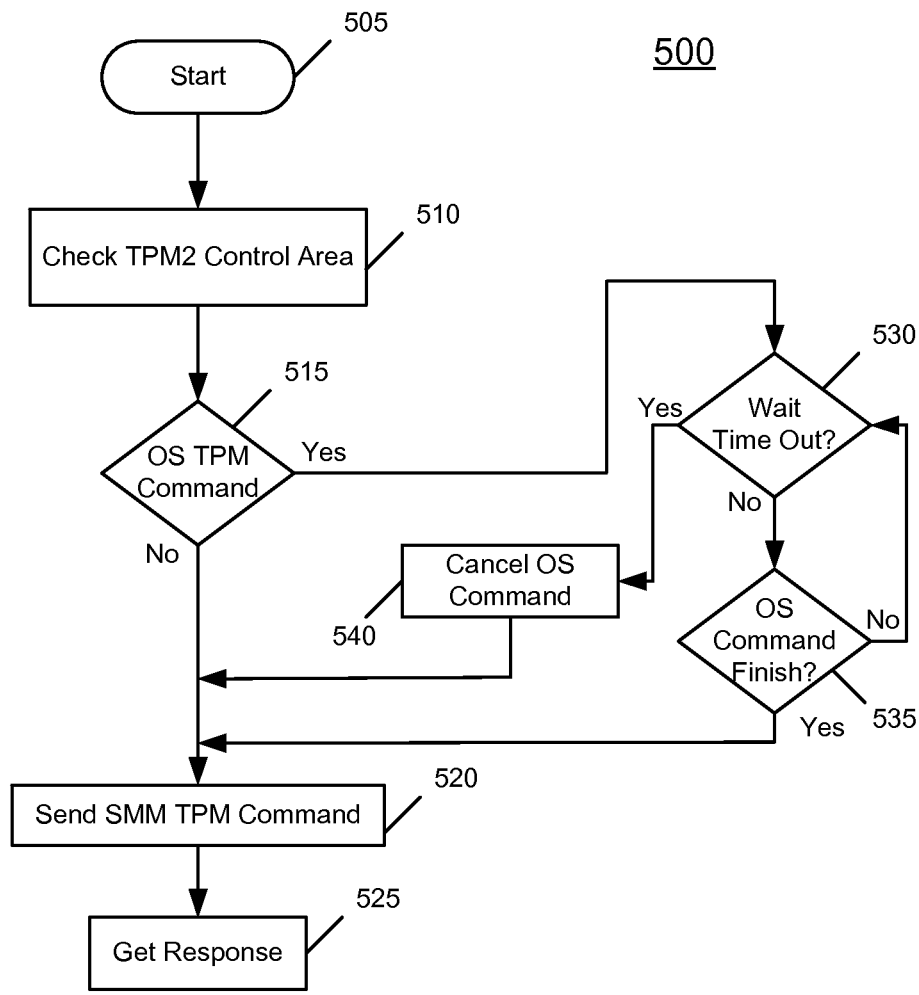
FIG. 5 includes in a process for operating system (OS) and system management mode (SMM) operations accessing a UEFI variable stored in a TPM in an embodiment of the invention.

FIG. 5 includes in a process for OS and SMM operations accessing a UEFI variable stored in a TPM in an embodiment of the invention. There are several ways to allow SMM/OS TPM access. First, as shown in FIG. 5 beginning with start block 505, in SMM the system checks a TPM.STATUS bit (block 510). If there is already an OS TPM command present (block 515) then the system waits for the OS TPM command to finish (block 530). Upon a time out the system cancels the command (block 540) or continues to wait for the OS command to finish (block 535). After blocks 535, 540 the system sends the SMM TPM command (block 520) knowing there is no longer a conflict with an OS command. A response can then be obtained (block 525). In block 515 is there is not OS TPM command present the process may proceed to block 520.

In other embodiments, the SMM TPM command may be placed in a queue, and a periodic system management interrupt (SMI) may be used to check TPM state (e.g., is an OS command present?) in a periodic SMI handler. Another embodiment traps all TPM Accesses (e.g., OS TPM accesses), and always accesses TPM hardware in SMM (so there is no conflict with SIC or OS TPM accesses).

As described herein, an embodiment (1) maps UEFI variables into secure TPM NV memory, (2) lets SIC code have a generic way to access UEFI variable, independent of variable flash layout, so the SIC IBB can be deployed on any platform, (3) uses better security control, like read_only and write_only, to protect the UEFI variables. The variables may be used to store configuration data, secrets such as a Platform Key (PK) and/or Key Exchange Key (KEK) addressed in UEFI specification (2.3.1c), PIN, and the like.

An embodiment enables SIC IBB to have a generic way to access platform dependent memory regions and allow a party (such as a processor manufacturer) to accommodate and work with widely varying BIOS configurations. An embodiment also provides a way to resolve confidentiality issues for UEFI variables, combining a platform security feature of a TPM with the variables.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving storage. A medium may include any mechanism for storing, transmitting, or receiving information in a form readable by a machine, and the medium may include medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 6:
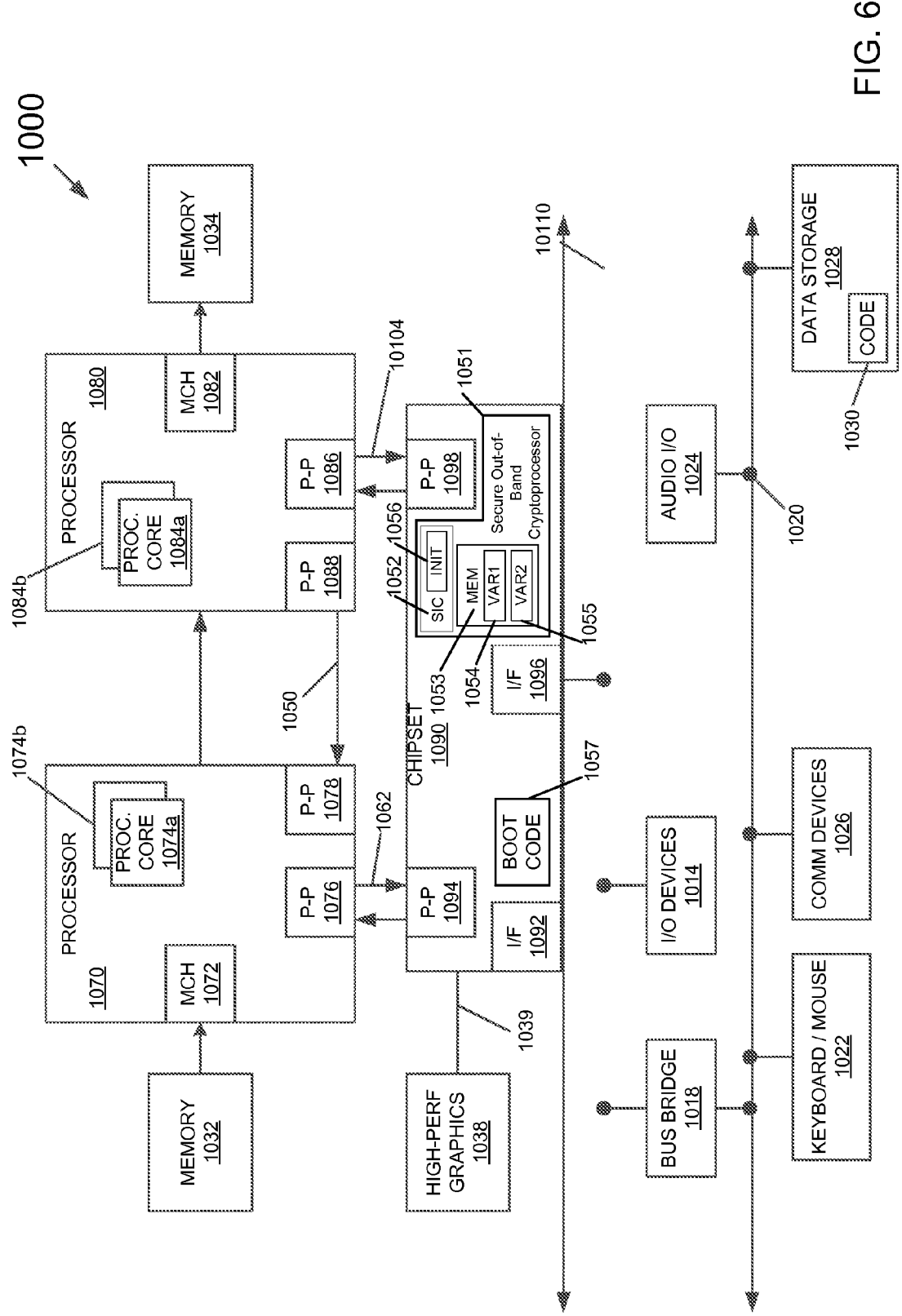
FIG. 6 includes a system for use with an embodiment of the invention.

Referring now to FIG. 6, shown is a block diagram of a system embodiment 1000 in accordance with an embodiment of the present invention. System 1000 may be included in, for example, a mobile computing node such as a cellular phone, smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discrete logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components. Chipset 1090 may also include or couple to a chip or chipset that includes secure out-of-band cryptoprocessor 1051 (e.g., a TPM that is out-of-band from processors 1070, 1080), that includes secure memory 1053 that may further include UEFI variables 1054, 1055 (or other such variables). SIC 1052, including initialization code 1056 (e.g., initialization code for memory 1032, processor 1070, and the like), may also be included within or coupled to cryptoprocessor 1051. Furthermore, SIC 1052 may hand off to boot code 1057, which may be included in or coupled to chipset 1090.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Various components of system 1000, such as components 1070, 1080, 1032, 1034, 1038, 1090, may include the RDL lines described herein.

Note that other embodiments are contemplated. For example, instead of the point-to-point architecture shown, a system may implement a multi-drop bus or another such communication topology. Also, the elements of the Figure may alternatively be partitioned using more or fewer integrated chips than shown in the Figure.

Figure 7:
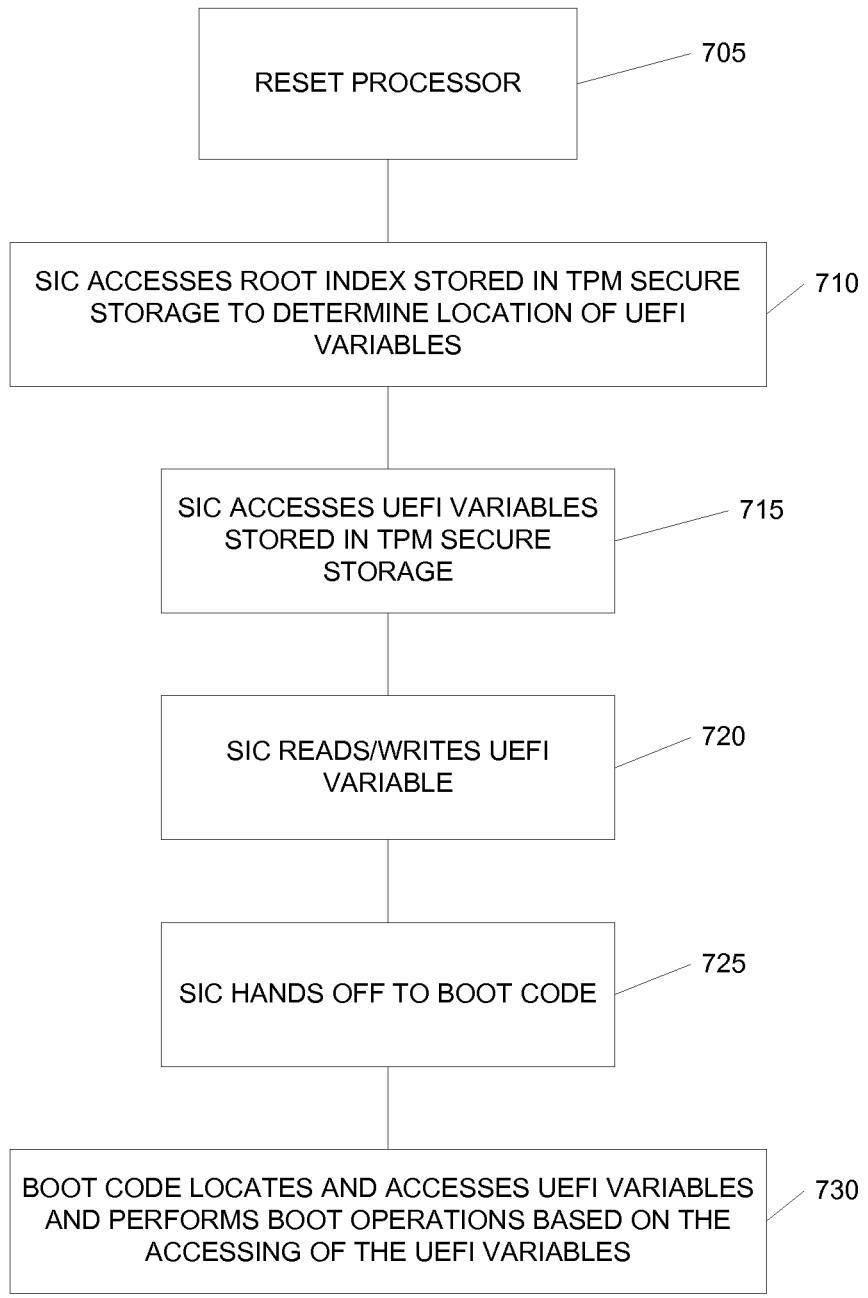
FIG. 7 includes a secure computing process in an embodiment of the invention.

FIG. 7 includes a process in an embodiment. In block 705 the processor is reset. In block 710 SIC accesses a root index to determine the locations for UEFI variables stored in the secure storage of a TPM or other such out-of-band processor/chip set. In block 715 the SIC accesses the located variables and performs pre-boot operations in response thereto. Such operations may include reading or writing to the accessed variables (block 720). In block 725 the SIC hands off operations to boot code. In block 730 the boot code may access the root index to determine the locations for the UEFI variables stored in the secure storage of the TPM and access the located variables and perform boot operations in response thereto.

Example 1 includes an apparatus comprising: an out-of-band cryptoprocessor including secure non-volatile storage that couples to a root index, having a fixed address, and comprises first and second variables referenced by the root index; and semiconductor integrated code (SIC) including embedded processor logic to initialize a processor and embedded memory logic to initialize a memory coupled to the processor; wherein (a) the SIC is to be executed responsive to resetting the processor and prior to providing control to boot code, and (b) the SIC is to perform pre-boot operations in response to accessing at least one of the first and second variables. The cryptoprocessor may be out-of-band with the processor.

In example 2 the subject matter of Example 1 can optionally include the boot code, wherein the boot code is to perform boot operations in response to accessing at least one of the first and second variables.

In example 3 the subject matter of Examples 1-2 can optionally wherein the first and second variables are Unified Extensible Firmware Interface (UEFI) variables and the cryptoprocessor includes an out-of-band Trusted Product Module (TPM).

In example 4 the subject matter of Examples 1-3 can optionally include wherein the SIC is to determine locations for the first and second variables in response to accessing the root index; and the boot code is to determine the locations for the first and second variables in response to accessing the root index.

In example 5 the subject matter of Examples 1-4 can optionally include wherein at least one of the SIC and an operating system (OS) is to write to the first variable in response to at least one of the SIC, the OS, and the boot code accessing the root index.

In example 6 the subject matter of Examples 1-5 can optionally include wherein the first and second variables are accessible during both runtime and boottime.

In example 7 the subject matter of Examples 1-6 can optionally include wherein the first and second variables are accessible to the SIC during both runtime and boottime and are accessible to an operating system (OS) during runtime.

In example 8 the subject matter of Examples 1-7 can optionally include wherein the first and second variables are accessible during runtime to both operating system (OS) and system management mode (SMM) operations.

In example 9 the subject matter of Examples 1-8 can optionally include wherein the first and second variables are not simultaneously accessible during runtime to both of the OS and SMM operations.

In example 10 the subject matter of Examples 1-9 can optionally include wherein the SIC is included in the cryptoprocessor and the secure non-volatile storage includes the root index.

In example 11 the subject matter of Examples 1-10 can optionally include wherein the first variable includes at least one of (a) a root key for a platform that couples the cryptoprocessor to the processor and to the memory, (b) configuration data for the processor, and (c) a hash of a variable. Thus, non-volatile storage that comprises first and second variables may constitute non-volatile storage that comprises first and second hashes of variables. The hash itself may be construed as a variable. Embodiments are not limited to hashes and may include other space saving derivatives of variables.

In example 12 the subject matter of Examples 1-11 can optionally include wherein the first variable is at least one of write protected and read protected.

Example 13 includes a method executed by a processor comprising: executing semiconductor integrated code (SIC) responsive to the processor being reset; wherein executing the SIC includes executing (a) embedded processor logic to initialize the processor, (b) embedded memory logic to initialize a memory coupled to the processor, and (c) pre-boot operations in response to accessing at least one of first and second variables; after executing the SIC, providing control to the boot code; and wherein the processor is coupled to a cryptoprocessor that includes secure non-volatile storage that couples to a root index, having a fixed address, and comprises the first and second variables referenced by the root index.

In example 14 the subject matter of Example 13 can optionally include the boot code performing boot operations in response to accessing at least one of the first and second variables.

In example 15 the subject matter of Examples 13-14 can optionally include the SIC determining locations for the first and second variables in response to accessing the root index; and the boot code determining the locations for the first and second variables in response to accessing the root index.

In example 16 the subject matter of Examples 13-15 can optionally include at least one of the SIC and an operating system (OS) writing to the first variable in response to at least one of the SIC, the OS, and the boot code accessing the root index.

In example 17 the subject matter of Examples 13-16 can optionally include the SIC accessing the first and second variables during both runtime and boottime; and an operating system accessing the first and second variables during runtime.

In example 18 the subject matter of Examples 13-17 can optionally include accessing the first and second variables during both runtime and boottime.

In example 19 the subject matter of Examples 13-18 can optionally include the SIC accessing the first and second variables during both runtime and boottime; and an operating system (OS) accessing the first and second variables during runtime.

In example 20 the subject matter of Examples 13-19 can optionally include wherein the first variable includes at least one of (a) a root key for a platform that couples the cryptoprocessor to the processor and to the memory, and (b) configuration data for the processor.

In example 21 at least one machine readable medium comprising a plurality of instructions that in response to being executed on a computing device, cause the computing device to carry out a method according to any one of examples 13 to 20.

Example 22 includes an apparatus comprising means for performing any one of examples 13 to 20.

Example 23 includes a cryptoprocessor including secure non-volatile storage that couples to an index and comprises a first variable referenced by the index; and semiconductor integrated code (SIC) including embedded processor logic to initialize a processor; wherein (a) the SIC is to be executed responsive to resetting the processor and accessing the first variable, and (b) the first variable is accessible during both runtime and boottime.

In example 24 the subject matter of Example 23 can optionally include boot code, wherein: the boot code performs boot operations in response to accessing the first variable; the SIC determines a location for the first variable in response to accessing the index; and the boot code determines the location for the first variable in response to accessing the index.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. An apparatus comprising:
an out-of-band cryptoprocessor including secure non-volatile storage that couples to a root index, having a fixed address, and comprises first and second variables referenced by the root index; and semiconductor integrated code (SIC) including embedded processor logic to initialize a processor and embedded memory logic to initialize a memory coupled to the processor;

wherein (a) the SIC is to be executed responsive to resetting the processor and prior to providing control to boot code, and (b) the SIC is to perform pre-boot operations in response to accessing at least one of the first and second variables.

2. The apparatus of claim 1 comprising the boot code, wherein the boot code is to perform boot operations in response to accessing at least one of the first and second variables.

3. The apparatus of claim 2 wherein the first and second variables are Unified Extensible Firmware Interface (UEFI) variables and the cryptoprocessor includes a Trusted Product Module (TPM) that is out-of-band with the processor.

4. The apparatus of claim 2, wherein:
the SIC is to determine locations for the first and second variables in response to accessing the root index; and
the boot code is to determine the locations for the first and second variables in response to accessing the root index.

5. The apparatus of claim 4, wherein at least one of the SIC and an operating system (OS) is to write to the first variable in response to at least one of the SIC, the OS, and the boot code accessing the root index.

6. The apparatus of claim 1, wherein the first and second variables are accessible during both runtime and boottime.

7. The apparatus of claim 1 wherein the first and second variables are accessible to the SIC during both runtime and boottime and are accessible to an operating system (OS) during runtime.

8. The apparatus of claim 1, wherein the first and second variables are accessible during runtime to both operating system (OS) and system management mode (SMM) operations.

9. The apparatus of claim 8, wherein the first and second variables are not simultaneously accessible during runtime to both of the OS and SMM operations.

10. The apparatus of claim 1, wherein the SIC is included in the cryptoprocessor and the secure non-volatile storage includes the root index.

11. The apparatus of claim 1 wherein the first variable includes at least one of (a) a root key for a platform that couples the cryptoprocessor to the processor and to the memory, and (b) configuration data for the processor.

12. The apparatus of claim 1, wherein the first variable is at least one of write protected and read protected.

13. At least one non-transitory storage medium having instructions stored thereon for causing a system to:
execute semiconductor integrated code (SIC) responsive to the processor being reset; wherein executing the SIC includes executing (a) embedded processor logic to initialize the processor, (b) embedded memory logic to initialize a memory coupled to the processor, and (c) pre-boot operations in response to accessing at least one of first and second variables;
after executing the SIC, provide control to boot code; and
wherein the processor is coupled to a cryptoprocessor that includes secure non-volatile storage that couples to a root index, having a fixed address, and comprises the first and second variables referenced by the root index.

14. The at least one medium of claim 13 comprising the boot code including instructions to perform boot operations in response to accessing at least one of the first and second variables.

15. The at least one medium of claim 14 comprising instructions to cause:
the SIC to determine locations for the first and second variables in response to accessing the root index; and
the boot code to determine the locations for the first and second variables in response to accessing the root index.

16. The at least one medium of claim 15 comprising instructions to cause at least one of the SIC and an operating system (OS) to write to the first variable in response to at least one of the SIC, the OS, and the boot code accessing the root index.

17. The at least one medium of claim 14 comprising instructions to cause:
the SIC to access the first and second variables during both runtime and boottime; and
an operating system to access the first and second variables during runtime.

18. The at least one medium of claim 13 comprising instructions to access the first and second variables during both runtime and boottime.

19. The at least one medium of claim 13 wherein the first variable includes at least one of (a) a root key for a platform that couples the cryptoprocessor to the processor and to the memory, and (b) configuration data for the processor.

20. An apparatus comprising:
a cryptoprocessor including secure non-volatile storage that couples to an index and comprises a first variable referenced by the index; and
semiconductor integrated code (SIC) including embedded processor logic to initialize a processor;
wherein (a) the SIC is to be executed responsive to resetting the processor and accessing the first variable, and (b) the first variable is accessible during both runtime and boottime.

21. The apparatus of claim 20 comprising boot code, wherein:
the boot code performs boot operations in response to accessing the first variable;
the SIC determines a location for the first variable in response to accessing the index; and
the boot code determines the location for the first variable in response to accessing the index.

* * * * *